May 1, 1945.　　　　H. H. HILE　　　　2,375,105
RESILIENT MOUNTING
Filed Dec. 24, 1942
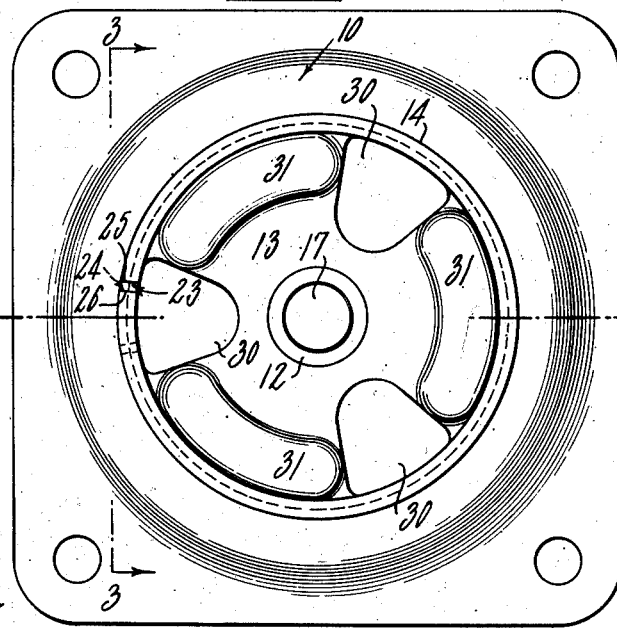
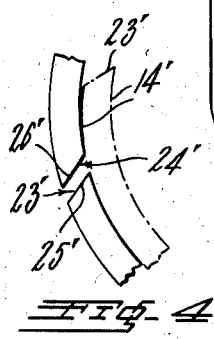
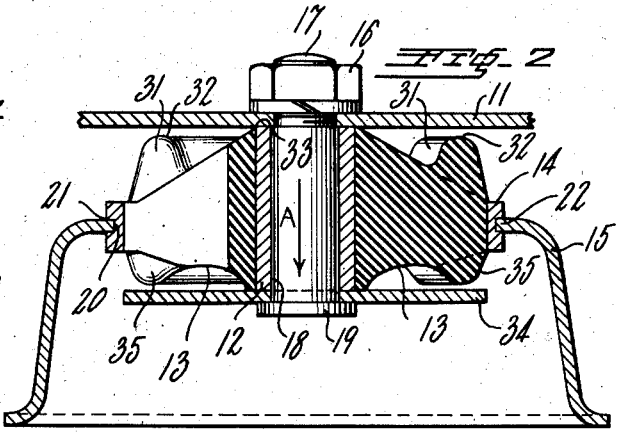
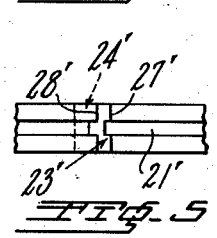
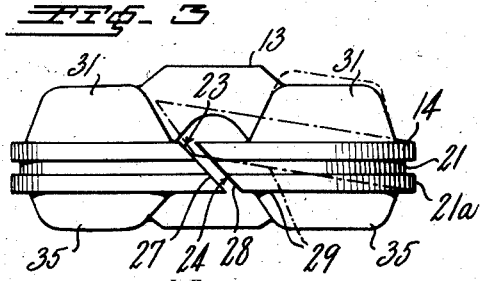
INVENTOR.
HESTON H. HILE
BY *Lester G. Budley*
ATTORNEY Patented May 1, 1945

2,375,105

UNITED STATES PATENT OFFICE 2,375,105

RESILIENT MOUNTING

Heston H. Hile, Riverside, Conn., assignor to United States Rubber Company, New York, N. Y., a corporation of New Jersey Application December 24, 1942, Serial No. 470,086

3 Claims. (Cl. 248—358)

This invention relates to an improved resilient mounting for supporting one object in respect to another. The invention relates particularly to a mounting having an intermediate member of resilient material surrounding and bonded to an inner attaching member adapted to be connected to one of the objects and surrounded by and bonded to an outer attaching member adapted to be connected to the other object by expanding into a socket on a base member connected to or forming a part of the latter object.

This invention is particularly useful in mounting relatively light instruments in airplanes to prevent the vibrations of the plane from being transmitted to the instrument. The resilient mounting embodying this invention, however, may be used in other relations and also to prevent vibrations originating in the supported member from being transmitted to the base on which such supported member may be carried.

One of the advantages of this mounting over prior mountings is that it may be easily attached to and removed from the base on which the outer attaching member is supported. The expansive force of the outer attaching member against a socket in a base provides a means for holding the mounting in place, and no separate fasteners or securing means are required such as bolts, or screws, or crimping the metal of the base around the outer member as was employed heretofore. To install the mounting it is merely necessary to radially contract the outer member to a smaller diameter than the socket and after inserting it in the socket, permit it to expand against the inner marginal edge of the socket. The mounting may be removed similarly upon contracting the outer member.

The resilient mounting embodying this invention has the further important characteristic of being provided with openings arranged around its periphery so as to control its natural frequency of vibration, and also to make it easier to contract the outer attaching member. Another important feature of the mounting is the provision of raised portions of resilient material positioned between said openings adjacent to the periphery of the resilient member for the purpose of cushioning the excessive movements of the inner member with respect to the outer member of the mounting.

The foregoing and other objects and advantages of this invention will be understood by referring to the following description and the accompanying drawing in which:

Fig. 1 is a plan view of a resilient mounting embodying this invention;

Fig. 2 is a cross-sectional view of the mounting shown in Fig. 1, taken on the line 2—2 of Fig. 1;

Fig. 3 is a side elevational view of the mounting shown in Figs. 1 and 2 when it is out of its socket and looking in the direction of arrows 3—3 in Fig. 1, and illustrating how a split in the outer attaching member permits the member to contract;

Fig. 4 is a fragmentary plan view of a modified form of the outer attaching member, showing the split portion, and Fig. 5 is a side elevational view of the split portion shown in Fig. 4.

Referring to the drawing, the resilient mounting 10 is adapted to support one object in respect to another. One or more of the mountings of the type shown may be used to support the base of the same object or instrument, for example, the mountings may be used in combination for supporting instruments, such as radios and the like, in airplanes. As shown in Fig. 2 of the drawing, one of the objects 11 to be supported is carried by an inner attaching member 12 which is floated in and bonded to resilient material 13, such as soft resilient rubber, either natural or synthetic which may be compounded as well known in the art. The term "rubber" as used herein means rubber or rubberlike materials which have been so treated, and/or compounded as to provide a soft elastic resilient material. The outer periphery of the intermediate resilient material 13 is bonded to an outer attaching member 14. The member 14 is secured to a base 15 which may constitute the other object, and in the present application of the device is the supporting member. The object, or supported member 11, carried by the inner member 12, is attached thereto by a nut 16 threaded on to a bolt 17 passing through a bore 18 in the inner member 12, and having a head 19 on its opposite end. The normal load applied by the object 11 on the inner member is exerted in the direction of the arrow A, shown in Fig. 2.

The outer member 14 is made in the form of a split ring so that it can be contracted radially and inserted in the opening 20 in the base 15. The ring 14 is provided with a circumferential groove 21 which is adapted to receive the marginal edge 22 of the socket or opening 20. In order that the ring 14 may be inserted in its socket 20 and may be securely held therein, it is transversely separated between two faces 23 and 24, which are bordered respectively by the lines 25 and 26 in the end or plan view of the ring, as shown in Fig. 1, and by the lines 27 and 28 in the side elevational view of the ring, as shown in Fig. 3. As shown in Figs. 1 and 3, the plane of the separating faces 23 and 24 is inclined at an acute angle to the axis of the ring, and the radii of the ring lie generally in the plane of the faces 23 and 24. In other words, the lines 25 and 26 extend generally radially towards the center of the ring, and the lines 27 and 28 in the cylindrical surface of the ring extend generally at an acute angle to a tangent drawn to the circumference of the ring and perpendicular to the radius of the circumference at the point of tangency.

The rubber 13 is vulcanized in a mold between the inner and outer attaching members 12 and 14 respectively. The attaching members 12 and 14 are made of relatively rigid material, preferably metal, and the rubber is bonded to these members during the vulcanizing process. The outer ring member 14, as shown herein, is made of spring metal, and it is so constructed that the faces 23 and 24 normally spring apart, as shown in Fig. 3. When the faces 23 and 24 are brought together into matching relation and in circumferential alignment with the other portions of the ring, the circumference of the bottom of the groove 21 is slightly smaller than the opening 20 in the base 15, and the circumference of the ring 14 at the top 21a, or outer edge of the groove 21, is larger than the opening 20. After the ring 14 is placed in the mold and during the vulcanizing process the faces 23 and 24 of the ring 14 are held in a spaced apart relation. When the ring 14 is in the mold the space between its faces 23 and 24 is sufficient to maintain a space between such faces after the mounting has been removed and the rubber 13 has shrunk and the ring is under no restraining influences other than that of the rubber. Such position of the faces 23 and 24 are shown by the full lines in Fig. 3.

The initial distance between the faces 23 and 24 after the rubber has been vulcanized, removed from the mold and allowed to cool until shrunk, is preferably such that when the ring 14 is installed in the opening 20 in the base 15, the faces will be close to or in contact with one another, and compression strains will be imparted to the rubber 13. When the ring 14 has been inserted in its socket 20 and such conditions are obtained, the ring is securely held in place due to the close relationship of the faces 23 and 24, and the expansive force of the groove 21 against the socket 20. Also the life of the mounting is increased due to the compression strains in the rubber.

In order to insert the ring 14 in the opening 20, the faces 23 and 24 are squeezed together and caused to slide along each other from their matched position shown by full lines in Fig. 3 until the bottom edge 29 at its intersection with the line 28 passes beyond the top side of the groove 21, as shown in dot and dash lines in Fig. 3, thereby bringing the faces 23 and 24 of the split sections out of circumferential alignment. When the ring has been deformed to the position shown by the dot and dash lines in Fig. 3, the groove 21 in the section of the ring 14 shown in full lines, opposite the dot and dash lines, is fitted over the edge 22 of the opening 20, and as much of the groove 21 as possible is fitted over the edge 22, while the bottom edge 29 of the ring adjacent to the face 24 remains above the marginal edge 22 of the support 15. The remaining portion of the groove 21 is inserted over the marginal edge 22 by beginning where the groove emerges above the edge 22 and progressively pushing the ring downwardly, and at the same time applying a radially inward pressure. These operations are progressively carried out until the groove 21 has been fitted over the edge 22, and the last remaining portion of the groove 22 in the dot and dash lines adjacent the face 22 of the split section has been fitted over the edge of the groove 22, and the faces 23 and 24 of the ring has again been forced into circumferential alignment. When the entire circumference of the groove 21 has been fitted over the edge 22, there will be very little space, if any, between the faces 23 and 24 and the ring 14 will be held tightly in position by the spring action of the ring against the edges 22 of the opening 20. The separation of the faces 23 and 24 in Fig. 1 is illustrated as being greater than normal in order to more clearly illustrate the invention.

The outer attaching member 14 is preferably made in one section of resilient material, such as metal, having sufficient elasticity to expand radially outwardly after having been contracted radially inward, but it will be understood that the outer attaching member 14 may be made in sectors, and the expansive force of the resilient material 13 after being contracted radially inwardly may be used to expand the sectors constituting the outer member 14.

The intermediate resilient member 13 is provided with openings 30 for the purpose of providing the mounting with the desired natural frequency of vibration. The openings 30 are placed in a balanced relation in respect to one another and one of them is placed opposite the line of split in the outer attaching ring 14 so that the rubber 13 will not unduly resist the movement of the split faces of the ring out of alignment with one another when the ring is being inserted in its socket. The resilient member 13 is provided with raised portions 31 interposed between the openings 30 adjacent to its periphery. Where the mounting is loaded as shown in Fig. 2, the top surfaces 32 of the raised portions 31 are located at a lower level than the top surface 33 of the inner member 12 and intermediate member 13, and are adapted to contact with the base of the object 11 when it moves downwardly to an excessive degree, and thereby cushions such excessive movements.

A disc 34 is clamped between the head 19 of the bolt 17 and the lower end of the inner member 12. When the mounting 10 is loaded as shown in Fig. 2 the top surface of the disc 34 is spaced from the bottom surface of the raised portions 35 on the bottom side of the rubber body 13. When the supported member 11 rebounds under excessive movements, the disc 34 strikes the projections 35 and cushions and limits the excessive upward movement.

The projections 31 and 35 on the top and bottom surfaces of the rubber 13 are placed wholly within the axial projection of the inner circumference of the ring 14, so that the rubber will more effectively absorb or resist the excessive movements of the load, due to the rubber being placed in shear rather than in compression between the members 11, 34, and the ring 14.

In Figs. 4 and 5 a modified construction of the outer attaching ring 14' is shown, in which the ring is divided in a different manner and a slightly different method of assembling the ring in its socket is illustrated. The ring 14 is divided so that the separating faces 23' and 24' are bordered by lines 25' and 26' on the end faces of the ring extending at an acute angle to the radius of the ring, and are bordered by lines 27' and 28' on the cylindrical surfaces of the ring and extending axially thereof. The ring is provided with a circumferential groove 21' which fits into the socket 20. In order to assemble the ring 14', the faces 23' and 24' are forced together in circumferential alignment, and one of the faces, for example the face 23' is slid radially inwardly along the face 24' until its outer periphery clears the inner periphery on the opposite section. Then the outer circumference of the section containing the face 23' is slid circumferentially along the inner circumference of the section containing the face 24' until the face 23' occupies the position as shown in dot and dash lines in Fig. 4. When the ring is contracted in this manner the overall diameter of the ring 14' may be reduced so that it may be inserted in the opening 20 and permitted to expand into place with the groove 21' fitting over the edge 22 of the socket 20. The ring 14' may be inserted by either reducing its overall diameter to a smaller diameter than the opening 20 and then bringing the entire circumference of the groove 21' opposite the opening 20, or by reducing the diameter to such an extent that one portion of the groove may be inserted into the opening and then the other.

While I have described this invention in detail, it will be understood that changes may be made without departing from the spirit of the invention and the subject matter defined in the appended claims. For example, the faces 23, and 24 of the ring 14 shown in Figs. 1 and 3, may be so formed that the lines 27 and 28 may retain their angular position as shown in Fig. 3, while the lines 25 and 26 representing the end view, may be at an angle to the radii of the mounting as shown in Fig. 4.

Having thus described my invention what I claim and desire to protect by Letters Patent is:

1. A resilient mounting adapted to support one object in respect to another, said mounting comprising an inner attaching member adapted to be connected to one of the objects and an outer attaching ring adapted to be attached to the other object by inserting said ring in a circular socket smaller than the completely expanded dimension of said ring, an intermediate member of soft resilient rubber bonded to said inner member and to said outer ring, said ring being divided by a slot having opposed faces, substantially the entire surfaces of said faces being adapted to slide in contact with each other in a peripheral direction of said ring but at an inclination to the periphery of said ring to contract same, said intermediate member having a recess therein opposite to and extending radially inwardly from said faces whereby said ring may be contracted and inserted in the socket without tearing said resilient member.

2. A resilient mounting adapted to support one object in respect to another, said mounting comprising an inner attaching member adapted to be connected to one of the objects and an outer attaching ring adapted to be attached to the other object, an intermediate member of soft resilient rubber bonded to said inner member and to said outer ring, said ring being divided by a slot having opposed faces generally inclined at an acute angle to the axis of said ring, substantially the entire surfaces of said faces being adapted to slide in contact with each other in a peripheral direction of said ring but at an inclination to the periphery of said ring to contract same, said intermediate member having a recess therein opposite to and extending radially inwardly from said faces, said outer ring having a circumferential groove in its outer surface, and said ring being adapted to expand from its contracted position until said groove engages a socket smaller than the completely expanded dimension of said ring.

3. A resilient mounting adapted to support one object in respect to another, said mounting comprising an inner attaching member adapted to be connected to one of the objects and an outer attaching ring adapted to be attached to the other object, an intermediate member of soft resilient rubber bonded to said inner member and to said outer ring, said ring being divided by a slot having opposed faces generally inclined to the radii of said ring, substantially the entire surfaces of said faces being adapted to slide in contact with each other in a peripheral direction of said ring but at an inclination to the periphery of said ring to contract same, said intermediate member having a recess therein opposite to and extending radially inwardly from said faces, said outer ring having a circumferential groove in its outer surface, and said ring being adapted to expand from its contracted position until said groove engages a socket smaller than the completely expanded dimension of said ring.

HESTON H. HILE.